US009043388B2

(12) United States Patent
Bulut et al.

(10) Patent No.: US 9,043,388 B2
(45) Date of Patent: May 26, 2015

(54) AGGREGATION AND QUEUING OF COMMUNICATIONS

(75) Inventors: Muhammed Fatih Bulut, Kenmore, NY (US); James E. Christensen, Cortlandt Manor, NY (US); David S. Marshak, Wrentham, MA (US); Andrew L. Schirmer, Andover, MA (US); Amy D. Travis, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 13/532,350

(22) Filed: Jun. 25, 2012

(65) Prior Publication Data

US 2013/0346595 A1 Dec. 26, 2013

(51) Int. Cl.
G06F 15/16 (2006.01)
H04L 29/08 (2006.01)

(52) U.S. Cl.
CPC ................................. *H04L 67/2833* (2013.01)

(58) Field of Classification Search
CPC ........................... H04L 29/0872; H04L 29/06
USPC .................. 709/203, 220, 224, 227; 707/737
See application file for complete search history.

(56) References Cited

U.S. PATENT DOCUMENTS 7,139,917 B2 *  11/2006  Jablon ........................... 713/183
8,260,736 B1 *   9/2012  Lear et al. ..................... 706/46
8,584,205 B2 *  11/2013  Lawrence et al. ............... 726/3
2002/0067832 A1 *   6/2002  Jablon ........................... 380/277
2005/0125498 A1   6/2005  Frank et al.
2006/0256816 A1  11/2006  Yarlagadda et al.
2007/0015497 A1   1/2007  Patel et al.
2007/0261112 A1 *  11/2007  Todd et al. ..................... 726/11
2009/0175264 A1   7/2009  Reitalu et al.
2010/0042846 A1 *   2/2010  Trotter et al. ................. 713/182
2010/0179992 A1   7/2010  Chakra et al.
2013/0031598 A1 *   1/2013  Whelan et al. ................... 726/1
2013/0217364 A1   8/2013  Varoglu et al.

OTHER PUBLICATIONS

Jordandev, "LockInfo 2.0—How the iPhone Lockscreen Should Be," date entry posted Jan. 20, 2010, <jordandev.info/archives/228>.

(Continued)

*Primary Examiner* — Khanh Dinh
(74) *Attorney, Agent, or Firm* — Ian A. McKee; Maeve L. McCarthy (57) ABSTRACT

A computer receives a first attempt at communication made via a first communication channel and stores a first attempt record corresponding to the first attempt at communication in an attempts file. The computer receives a second attempt at communication made through a second communication channel that is different from the first communication channel and stores a second attempt record corresponding to the second attempt at communication in the attempts file. The computer queues at least a portion of the first attempt record and at least a portion of the second attempt record. The computer determines that the first attempt at communication and the second attempt at communication were created by a common sender, determines a third communication channel for replying to the common sender, and transmits a third attempt at communication to the common sender via the third communication channel.

11 Claims, 5 Drawing Sheets

(56) References Cited

OTHER PUBLICATIONS

"RingCentral Call Logs Service," RingCentral, Inc., © 1999-2011, dated printed Feb. 2, 2012 <www.ringcentral.com/features/call-logs/overview.html>.

"Cisco Unity Connection—Products and Services—Cisco Systems"; dated printed Feb. 7, 2012; <http://www.cisco.com/en/US/products/ps6509/index.html>.

* cited by examiner

AGGREGATION AND QUEUING OF COMMUNICATIONS

FIELD OF THE INVENTION

The present invention relates generally to communication systems, and more particularly to aggregating and queuing communications from multiple communication systems for a user.

BACKGROUND

The use of communication channels of many types has increased greatly, given the recent proliferation of communication technologies. Communication channels in widespread use include, for example, telephone voice channels, cellular phone text message channels, computerized instant messaging channels, electronic mail channels, and so on. It is often the case that a given person is able to use a given communication channel in multiple ways. For example, a given person may have a business phone number and a cell phone number, or may have multiple email addresses. Some communication channels require users to log in to operate, while others do not. It is often the case that one person wants to communicate with another immediately or very soon, to give or receive information or to otherwise collaborate in a timely fashion. Channels that enable such communications can be referred to as real-time communication channels. Typically, one person will attempt to contact another using a real time communication channel, and the person being contacted can decide whether, or if, to respond. As communication services and technology evolve, the number of alternate communication channels that people use to contact each other grows. As such, the burden of monitoring and managing all of the possible communication channels, with their attendant devices and interfaces, grows ever greater.

Several current solutions attempt to alleviate the burden of monitoring and managing multiple communication channels. For example, unified communications solutions involve the integration of real-time communication services such as instant messaging, presence information, telephony, and video conferencing with non-real-time communication services such as unified messaging (integrated voicemail, email, text messaging, and fax). Unified communications solutions typically involve multiple products that attempt to provide a unified user interface and user experience. Unified communications solutions can allow a person to send a message on one medium and have it be received on another medium. For example, a person can receive a voicemail message and choose to access it through e-mail or a cell phone. If the sender of the voicemail message is online, according to the sender's presence information, and available to currently accept calls, the response to the voicemail can be sent immediately through text chat or video call. Alternatively, it may be sent as a non real-time message that can be accessed through a variety of media. Unfortunately, no current solution adequately alleviates the burden of monitoring and managing multiple communication channels.

SUMMARY

Embodiments of the present invention provide for a program product, system, and method for managing a plurality of attempts at communication. A computer receives a first attempt at communication made via a first communication channel and stores a first attempt record corresponding to the first attempt at communication in an attempts file. The computer receives a second attempt at communication made through a second communication channel that is different from the first communication channel and stores a second attempt record corresponding to the second attempt at communication in the attempts file. The computer queues at least a portion of the first attempt record and at least a portion of the second attempt record. The computer determines that the first attempt at communication and the second attempt at communication were created by a common sender, determines a third communication channel for replying to the common sender, and transmits a third attempt at communication to the common sender via the third communication channel.

DETAILED DESCRIPTION

Figure 1:
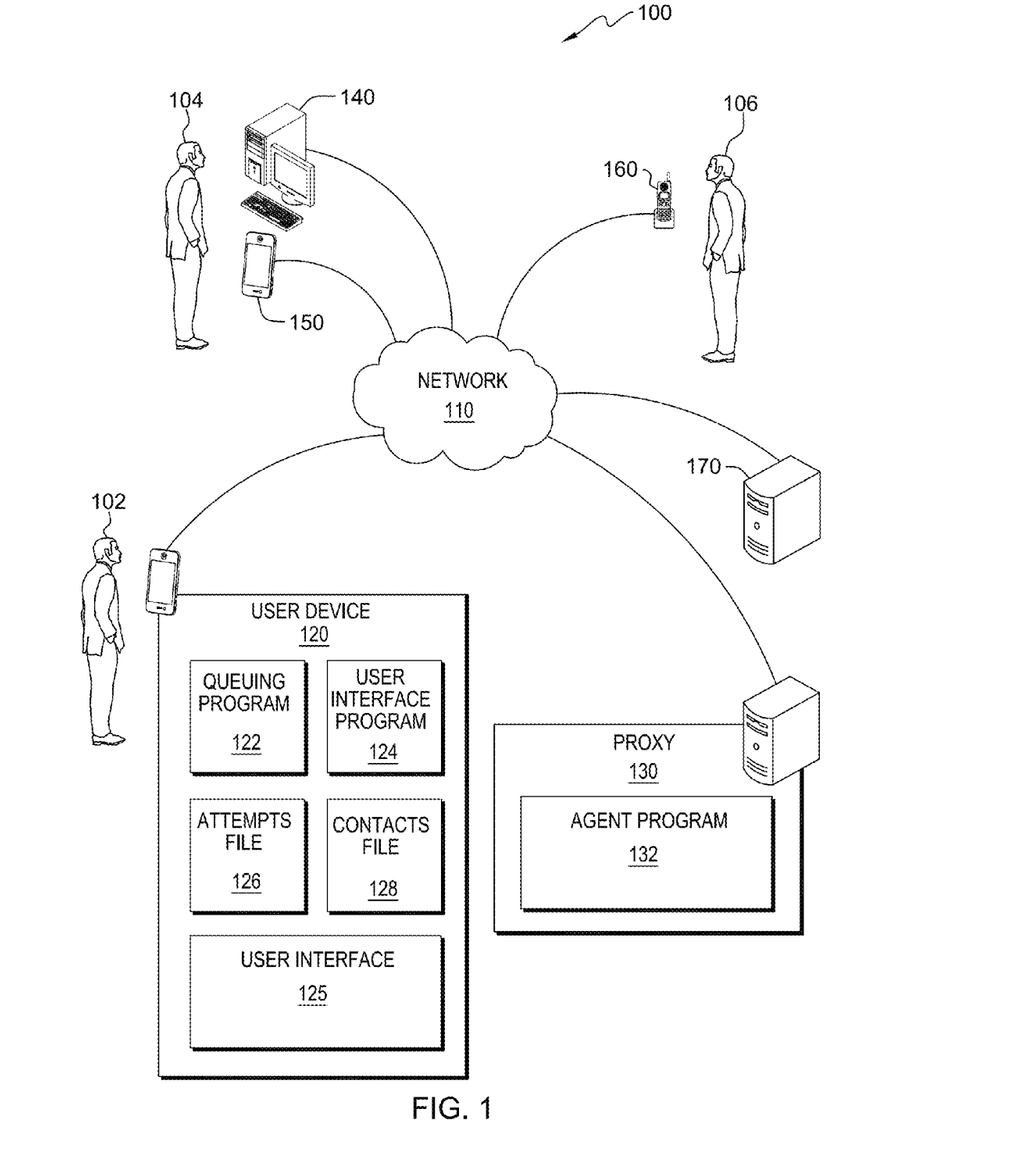
FIG. 1 is a functional block diagram of communications system 100 in accordance with an embodiment of the present invention.

FIG. 1 depicts a functional block diagram of communications system 100 in accordance with an illustrative embodiment of the present invention. Communications system 100 includes network 110, user device 120, proxy 130, computer 140, smart phone 150, telephone 160, and server 170. Network 110 can be, for example, a local area network (LAN), a wide area network (WAN) such as the Internet, or a combination of the two, and can include wireline or wireless connections. In general, network 110 can be any combination of connections and protocols that will support communications via various channels between user device 120, proxy 130, computer 140, smart phone 150, telephone 160, and server 170 in accordance with an embodiment of the invention. Persons 102, 104, and 106 can use communications system 100 to communicate with each other via various channels as described below.

In various embodiments, each one of user device 120, proxy 130, computer 140, smart phone 150, telephone 160, and server 170 can include a laptop, tablet, or netbook personal computer (PC), a desktop computer, a personal digital assistant (PDA), a smart phone, a mainframe computer, or a networked server computer. Further, proxy 130 and server 170 can represent computing systems utilizing clustered computers and components to act as single pools of seamless resources when accessed through network 110, or can represent one or more cloud computing datacenters. In general, each one of user device 120, proxy 130, computer 140, smart phone 150, telephone 160, and server 170 can be any programmable electronic device as described in further detail with respect to FIG. 5.

Computer 140, smart phone 150, and telephone 160 can include in various embodiments a cellular phone, a conference phone, a speaker phone, a desk set, a computer with a resident software phone, or any other type of communication device that can exchange voice signals, exchange and process data, or both. Computer 140, smart phone 150, and telephone 160 are each able to transmit and receive voice signals, data signals, or both to and from each other and to and from user device 120, server 170, or both.

User device 120 includes queuing program 122, user interface program 124, user interface 125, attempts file 126, and contacts file 128. Programs 122 and 124, utilizing data stored in files 126 and 128, can operate to provide person 102 with a single point of aggregation, visible via user interface 125, for attempts to communicate with person 102. Several attempts to communicate with person 102 are discussed below with reference to FIG. 2 and FIG. 3. For certain types of attempts to communicate, programs 122 and 124 can also interoperate with agent program 132 of proxy 130 to provide person 102 with a single point of aggregation for each such attempt to communicate. The operation of programs 122 and 124, as well as program 132, will be described in more detail below.

Figure 2:
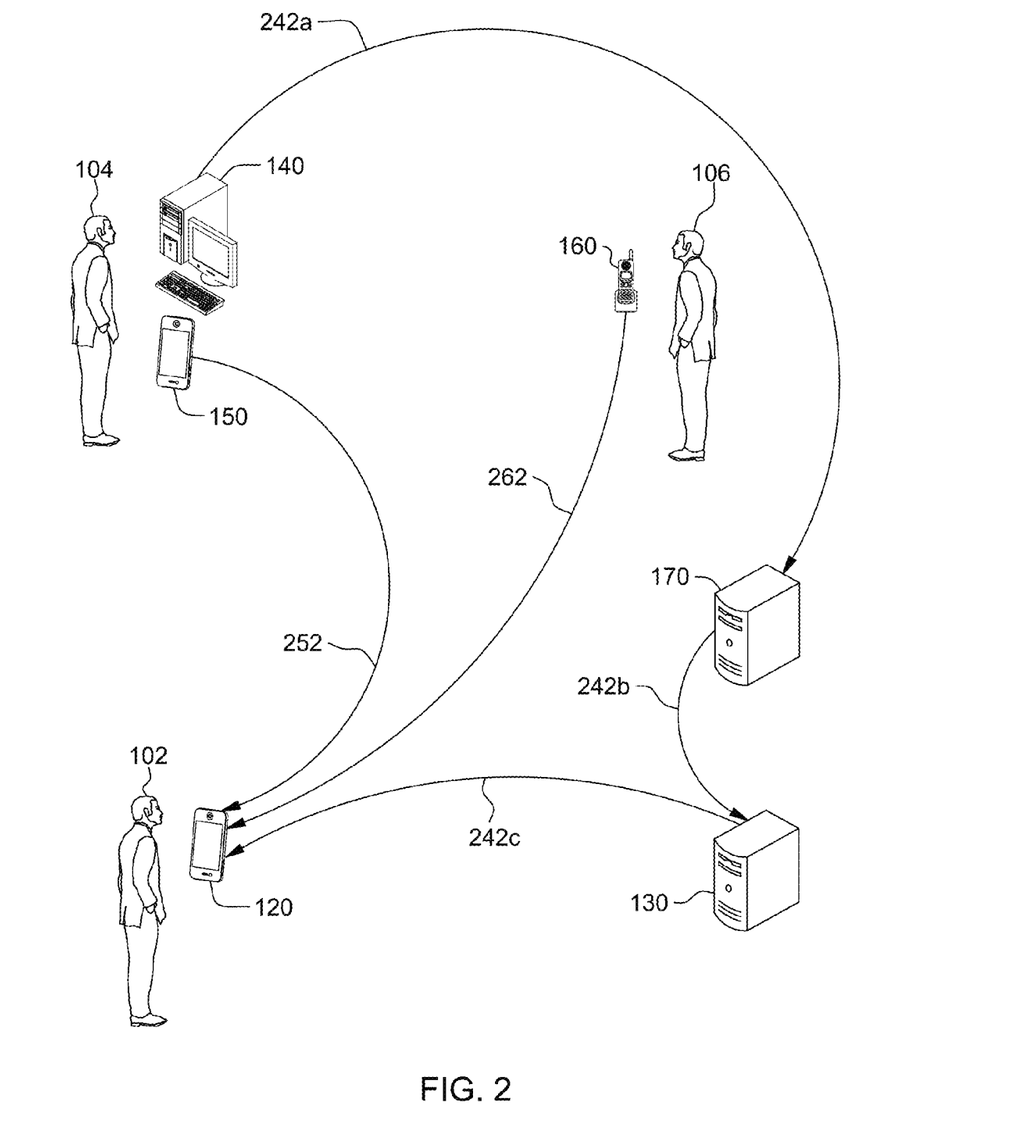
FIG. 2 is a diagram of attempts at communication being made in communications system 100 in accordance with an embodiment of the present invention.

FIG. 2 depicts several attempts to communicate with person 102 via various channels in accordance with an illustrative embodiment of the present invention. Each attempt to communicate is depicted in FIG. 2 as a message transmitted from one of computer 140, smart phone 150, or telephone 160 to user device 120, sometimes via server 170 and proxy 130. Upon receipt of a message, user device 120 can update user interface 125 and chime or otherwise indicate to person 102 that the message has arrived.

For example, a first attempt to communicate is depicted as account message attempt 242 transmitted from computer 140 to user device 120 via server 170 and proxy 130 (each distinct segment of the path taken by account message attempt 242 is depicted as 242a, 242b, or 242c in FIG. 2). This first attempt to communicate could include, for example, person 104 attempting to send person 102 account message attempt 242 by composing an email message on computer 140 and sending it to server 170. In one embodiment, in which server 170 is an email server, server 170 receives account message attempt 242 and stores it in association with an account of person 102. Proxy server 130, in possession of the email username and password of person 102, uses the email username and password of person 102 to log in to server 170 and retrieve account message attempt 242, thereinafter forwarding account message attempt 242 onward to user device 120. In another embodiment, in which server 170 is a social networking server, account message attempt 242 is a social networking account message. In this embodiment, proxy server 130, in possession of the social networking username and password of person 102, uses the social networking username and password of person 102 to log in to server 170 and indicate, by proxy, that person 102 is present and available to receive messages on server 170. Server 170 receives account message attempt 242 and stores it in association with an account of person 102, and proxy server 130 retrieves account message attempt 242 and thereinafter forwards account message attempt 242 to user device 120. In yet another embodiment, user device 120 can retrieve account message attempt 242 from server 170 directly, without the assistance of proxy 130.

In another example, a second attempt to communicate is depicted as SMS message attempt 252 transmitted from smart phone 150 to user device 120. This second attempt to communicate could include, for example, person 104 attempting to send person 102 SMS message attempt 252 by composing SMS message attempt 252 on smart phone 150 and sending it to user device 120 substantially directly. Further, a third attempt to communicate is depicted as call message attempt 262 transmitted from telephone 160 to user device 120. This third attempt to communicate could include, for example, person 106 attempting to call person 102 by dialing a phone number associated with user device 120 on telephone 160.

As discussed above, as depicted in FIG. 2, user device 120 receives account message attempt 242, SMS message attempt 252, and call message attempt 262. Each distinct account (e.g., an email account, social networking account, or another account used for communication) can be regarded as a channel for making an attempt at communication. Each distinct phone number (e.g., the phone number of smart phone 150, telephone 160, or another phone number used for communication) can be regarded as a channel for making an attempt at communication. Further, any distinct mode of communication or distinction made to distinguish a communication endpoint can be regarded as a channel for making an attempt at communication.

In one embodiment, account message attempt 242 and SMS message attempt 252 are attempts that include full message content. For example, account message attempt 242 can include an entire email message, or can include an entire social networking account message. Similarly, SMS message attempt 252 can include an entire SMS message. In another embodiment, account message attempt 242 and SMS message attempt 252 are attempts that do not include full message content, and instead include notifications that full message content is available elsewhere. For example, account message attempt 242 can include a notification that an entire email message or an entire social networking account message is available for retrieval on proxy 130 or server 170. Similarly, SMS message attempt 252 can include a notification that an entire SMS message is available for retrieval on a cell phone network server internal to network 110. In both embodiments, call message attempt 262 will not include any message content, and instead will include a notification that telephone 160 is available to open a voice connection, for example.

Figure 3:
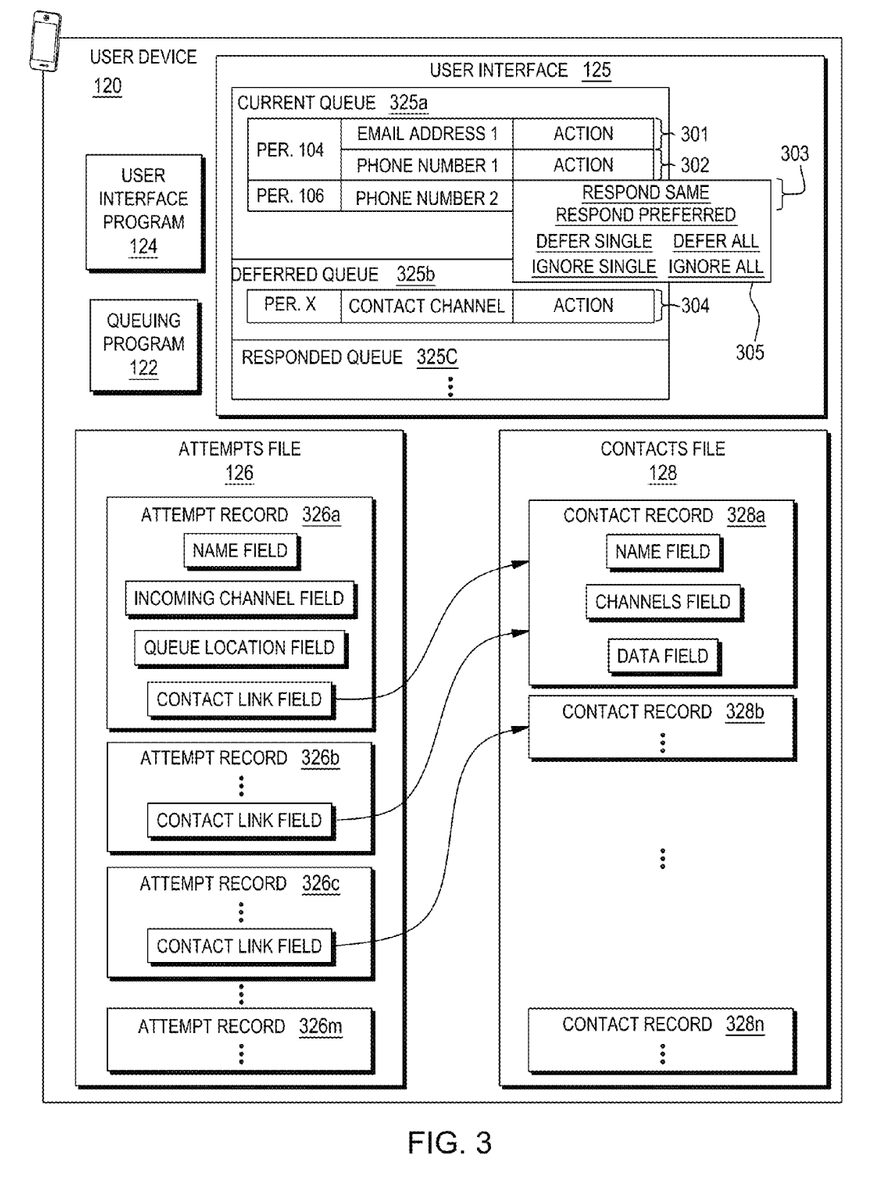
FIG. 3 is a functional block diagram of user device 120 and a display of user interface 125 in accordance with an embodiment of the present invention.

FIG. 3 depicts a functional block diagram of user device 120, including a display of user interface 125, in accordance with an illustrative embodiment of the present invention. User device 120 includes queuing program 122, user interface program 124, user interface 125, attempts file 126, and contacts file 128. Attempts file 126 includes attempt records 326a through 326m, and each attempt record 326 includes information about a single attempt at communication, such as message attempt 242, SMS message attempt 252, or call message attempt 262. Contacts file 128 includes contact records 328a through 328n, and each contact record 328 includes information about a person who makes one or more attempts to communicate with person 102 via user device 120 over one or more channels. The number m of attempt records 326 may be the same as or may vary from the number n of contact records 328. Programs 122 and 124, utilizing records stored in files 126 and 128, operate to provide person 102 with a single point of aggregation, visible via user interface 125, for attempts at communication, as discussed in detail below.

When account message attempt 242 is received by user device 120, queuing program 122 generates corresponding attempt record 326a in attempts file 126. Attempt record 326a contains fields that will be populated with information based on account message attempt 242, and also based on a search of contacts file 128. For example, the incoming channel field of attempt record 326a can be populated with the email address of the sender if account message attempt 242 includes an email message, or with the social networking account identifier of the sender if account message attempt 242 includes a social networking account message. Further, the name field of attempt record 326a can be populated with the name of the sender, if identifiable in account message attempt 242, or can populated subsequently, after a search of contacts file 128, as discussed below. Further, the contact link field of attempt record 326a is populated based on a search of contacts file 128 for a matching contact record 328.

Before discussing a search of contacts file 128, several exemplary contact records 328 will be described. For instance, the name field of contact record 328a can include the name of person 104, and the channels field of contact record 328a can include both the email address of person 104 and the phone number of person 104. Further, the name field of contact record 328b can include the name of person 106, and the channels field of contact record 328b can include the phone number of person 106. Each contact record 328 also includes a data field that is populated with additional information relevant to attempts at communication received from a particular person, such as transcripts of prior communications, recordings of prior communications, voicemails, links to various attempt records 326, statistics related to communications with the person, the person's preferred channels, and other data or metadata.

Queuing program 122 searches contacts file 128 for a contact record 328 having a channels field that includes a channel matching the incoming channel field of attempt record 326a. Upon finding a matching contact record 328, for example contact record 328a, queuing program 122 populates the contact link field of attempt record 326a with a link to contact record 328a. For example, if the incoming channel field of attempt record 326a has the email address of the sender of account message attempt 242, and if a search of contacts file 128 locates the same email address in the channels field of contact record 328a, then queuing program 122 links attempt record 326a and contact record 328a via the contact link field of attempt record 326a. In one embodiment, queuing program 122 also links attempt record 326a and contact record 328a via a reverse link stored in the data field of contact record 328a (not shown).

Thus, upon receiving account message attempt 242 by user device 120, queuing program 122 generates attempt record 326a and populates its fields with information based on account message attempt 242 and on a search of contacts file 128. If the name field of attempt record 326a has not been populated with the name of a sender identifiable in account message attempt 242, then the name field will be populated by copying the name field of contact record 328a. Finally, queuing program 122 populates the queue location field of attempt record 326a with current queue 325a, to indicate that account message attempt 242 is a current attempt at communication, and notifies user interface program 124 that attempt record 326a can be displayed on user interface 125. User interface program 124 displays attempt record 326a on user interface 125 by displaying the name field (in this example, "Pers. 104"), the incoming channel field (in this example, "email address 1"), and an action prompt on row 301 within current queue 325a. Person 102 can interact with user interface 125 as discussed below.

When SMS message attempt 252 is received by user device 120, queuing program 122 generates corresponding attempt record 326b in attempts file 126. The incoming channel field of attempt record 326b can be populated with the phone number of the sender of SMS message attempt 252, which is smart phone 150. Further, the name field of attempt record 326b can be populated with the name of the sender, if identifiable in SMS message attempt 252, by caller ID for example. Alternatively, the name field of attempt record 326b can populated subsequently, after a search of contacts file 128. Further, the contact link field of attempt record 326b is populated based on a search of contacts file 128 for a matching contact record 328.

Specifically, queuing program 122 searches contacts file 128 for a contact record 328 having a channels field that includes a channel matching the incoming channel field of attempt record 326b. Upon finding a matching contact record 328, for example contact record 328a, queuing program 122 populates the contact link field of attempt record 326b with a link to contact record 328a. For example, if the incoming channel field of attempt record 326b has the phone number of smart phone 150, and if a search of contacts file 128 locates the same phone number in the channels field of contact record 328a, then queuing program 122 links attempt record 326b and contact record 328a via the contact link field of attempt record 326b. In one embodiment, queuing program 122 also links attempt record 326b and contact record 328a via a reverse link stored in the data field of contact record 328a (not shown).

Thus, upon receiving SMS message attempt 252 by user device 120, queuing program 122 generates attempt record 326b and populates its fields with information based on SMS message attempt 252 and on a search of contacts file 128. If the name field of attempt record 326b has not been populated with the name of the user of smart phone 150, then the name field will be populated by copying the name field of contact record 328a. Finally, queuing program 122 populates the queue location field of attempt record 326b with current queue 325a, to indicate that SMS message attempt 252 is a current attempt at communication, and notifies user interface program 124 that attempt record 326b can be displayed on user interface 125. User interface program 124 displays attempt record 326b on user interface 125 by displaying the name field (in this example, "Pers. 104"), the incoming channel field (in this example, "phone number 1"), and an action prompt on row 302 within current queue 325a. In one embodiment, user interface program 124 can determine that the attempts at communication displayed on row 301 and row 302 share the same name, and can thus merge the two displayed names into a single displayed name spanning both row 301 and row 302, as shown in FIG. 3. Person 102 can interact with user interface 125 as discussed below.

When call message attempt 262 is received by user device 120, queuing program 122 generates corresponding attempt record 326c in attempts file 126. The incoming channel field of attempt record 326c can be populated with the phone number of the sender of call message attempt 262, which is telephone 160. Further, the name field of attempt record 326c can be populated with the name of the sender, if identifiable in call message attempt 262, by caller ID for example. Alternatively, the name field of attempt record 326c can populated subsequently, after a search of contacts file 128. Further, the contact link field of attempt record 326c is populated based on a search of contacts file 128 for a matching contact record 328.

Specifically, queuing program 122 searches contacts file 128 for a contact record 328 having a channels field that includes a channel matching the incoming channel field of attempt record 326c. Upon finding a matching contact record 328, for example contact record 328b, queuing program 122 populates the contact link field of attempt record 326c with a link to contact record 328b. For example, if the incoming channel field of attempt record 326c has the phone number of telephone 160, and if a search of contacts file 128 locates the same phone number in the channels field of contact record 328b, then queuing program 122 links attempt record 326c and contact record 328b via the contact link field of attempt record 326c. In one embodiment, queuing program 122 also links attempt record 326c and contact record 328b via a reverse link stored in the data field of contact record 328b (not shown).

Thus, upon receiving call message attempt 262 by user device 120, queuing program 122 generates attempt record 326c and populates its fields with information based on call message attempt 262 and on a search of contacts file 128. If the name field of attempt record 326c has not been populated with the name of the user of telephone 160, then the name field will be populated by copying the name field of contact record 328b. Finally, queuing program 122 populates the queue location field of attempt record 326c with current queue 325a, to indicate that call message attempt 262 is a current attempt at communication, and notifies user interface program 124 that attempt record 326c can be displayed on user interface 125. User interface program 124 displays attempt record 326c on user interface 125 by displaying the name field (in this example, "Per. 106"), the incoming channel field (in this example, "phone number 2"), and an action prompt on row 303 within current queue 325a. Note that while FIG. 3 depicts actions menu 305 visually deployed from the action prompt of row 303, it should be understood that actions menu 305 may not be initially deployed, in one embodiment. The deployment of actions menu 305 is discussed in detail below. Person 102 can interact with user interface 125 as discussed below.

As user device 120 receives account message attempt 242, SMS message attempt 252, and call message attempt 262 as discussed above, queuing program 122 generates corresponding attempt records 326a, 326b, and 326c and links them to contact records 328a and 328b. As displayed by user interface program 124 on user interface 125, this combination of records and links indicates that person 104 has made two attempts at communication with person 102 at user device 120, via two different channels, and further indicates that person 106 has made one attempt at communication with person 102 at user device 120, via a third channel. User interface program 124 can also display on user interface 125 information from the data field of the contact record 328 linked to each displayed attempt record 326. For example, user interface program 124 can display a transcript of prior communications, a link to a recording of prior communications, a link to voicemail, statistic, preferred channels, or other data or metadata. Attempts file 126 can include additional attempt records 326 which each include information about additional single attempts at communication, and contacts file 128 can include additional contact records 328 which each includes additional information about a person who makes one or more attempts to communicate over one or more channels. Such an additional attempt record 326 can form the basis for displaying row 304 in deferred queue 325b which indicates, for example, that an attempt at communication older than those displayed in current queue 325a is still visible in user interface 125.

User interface program 124 displays attempt records 326a, 326b, and 326c on rows 301, 302, and 303 of user interface 125. In particular, the name field, incoming channel field, and an action prompt are displayed in each row. Person 102 can interact with user interface 125 to handle or respond to each such displayed attempt at communication in several ways. For example, person 102 can select an action prompt of row 303, and in response user interface program 124 visually deploys actions menu 305 on user interface 125.

Actions menu 305 can include, for example, a selectable choice to respond to the attempt at communication depicted in row 303 via the same channel (in this example, "Respond Same"). If person 102 selects to respond via the same channel, then user interface 125 displays a channel-appropriate response screen (not shown) and user device 120 makes an attempt at communication via the same channel. For example, depending on whether the inbound attempt at communication is active, user interface 125 displays an ongoing phone call screen and user device 120 accepts the call from telephone 160, or user interface 125 displays an outgoing phone call screen and user device 120 dials the phone number of telephone 160. After the attempt at communication via the same channel is finished, user interface 125 can cancel the display of the channel-appropriate response screen and re-display queues 325. Further, queuing program 122 can change the queue location field of attempt record 326c (which corresponds to the attempt at communication displayed in row 303) to be deferred queue 325b, responded queue 325c, or to an undisplay queue (e.g., to a value indicating that attempt record 326c should not be displayed in any queue), such that user interface program 124 alters user interface 125 to display the contents of row 303 at the correct queue 325 or not at all.

Actions menu 305 can also include, for example, a selectable choice to respond to the attempt at communication depicted in row 303 via a preferred channel (in this example, "Respond Preferred"). If person 102 selects to respond via the preferred channel, then user interface 125 displays a channel-appropriate response screen (not shown) and user device 120 makes an attempt at communication via the preferred channel. For example, in various embodiments, the preferred channel can be the same channel used by the incoming attempt at communication, the most recent successfully-used channel, the most frequently used channel, any available real-time channel, any available non-real-time channel, a favorite channel pre-selected by person 102, or a selectable channel currently selected by person 102, for example. After the attempt at communication via the preferred channel is finished, user interface 125 can cancel the display of the channel-appropriate response screen and re-display queues 325. Further, queuing program 122 can change the queue location field of attempt record 326c (which corresponds to the attempt at communication displayed in row 303) to be deferred queue 325b, responded queue 325c, or to the undisplay queue, such that user interface program 124 alters user interface 125 to display the contents of row 303 at the correct queue 325 or not at all.

Actions menu 305 can also include, for example, a selectable choice to defer a response to the attempt at communication depicted in row 303 (in this example, "Defer Single" or "Defer All"). If person 102 selects to defer singly, then queuing program 122 can change the queue location field of attempt record 326c (which corresponds to the attempt at communication displayed in row 303) to be deferred queue 325b, such that user interface program 124 alters user interface 125 to display the contents of row 303 at deferred queue 325b. If person 102 selects to defer all, then queuing program 122 can collectively change the queue location fields of attempt record 326c (which corresponds to the attempt at communication displayed in row 303) and related attempt records 326 to be deferred queue 325b, such that user interface program 124 alters user interface 125 to display the contents of row 303 and related rows at deferred queue 325b. Related attempt records 326 can be those that share with attempt record 326c a common person making an attempt at communication, or a common device making an attempt at communication, or a common time period within which attempts at communication are made, or a common channel type utilized in making attempts at communication, for example.

Actions menu 305 can also include, for example, a selectable choice to ignore the attempt at communication depicted in row 303 (in this example, "Ignore Single" or "Ignore All"). If person 102 selects to ignore singly, then queuing program 122 can change the queue location field of attempt record 326c (which corresponds to the attempt at communication displayed in row 303) to be the undisplay queue, such that user interface program 124 alters user interface 125 to cancel the display of the contents of row 303. If person 102 selects to ignore all, then queuing program 122 can collectively change the queue location fields of attempt record 326c (which corresponds to the attempt at communication displayed in row 303) and related attempt records 326 to be the undisplay queue, such that user interface program 124 alters user interface 125 to cancel the display of the contents of row 303 and related rows. Related attempt records 326 can be those that share with attempt record 326c a common person making an attempt at communication, or a common device making an attempt at communication, or a common time period within which attempts at communication are made, or a common channel type utilized in making attempts at communication, for example.

Several of the above examples have focused on person 102 selecting an action prompt of row 303 to deploy actions menu 305. Additional actions menus are similarly deployable from the action prompts of rows 301 and 302, for example. If person 102 had selected an action prompt of row 301 or row 302 to handle or respond to one of the two attempts at communication from person 104 by responding via a same or a preferred channel, then after the attempt at communication is finished, queuing program 122 could collectively change the queue location field of attempt records 326a and 326b to be deferred queue 325b, responded queue 325c, or to the undisplay queue, such that user interface program 124 alters user interface 125 to display the contents of row 301 and row 302 at the correct queue 325 or not at all. In various embodiments, queuing program 122 can handle or respond to multiple attempts at communication having various common features in this fashion. For example, attempts at communication having a common person making an attempt at communication, or a common device making an attempt at communication, or a common time period within which attempts at communication are made, or a common channel type utilized in making attempts at communication, for example, can collectively be re-queued after response.

Figure 4:
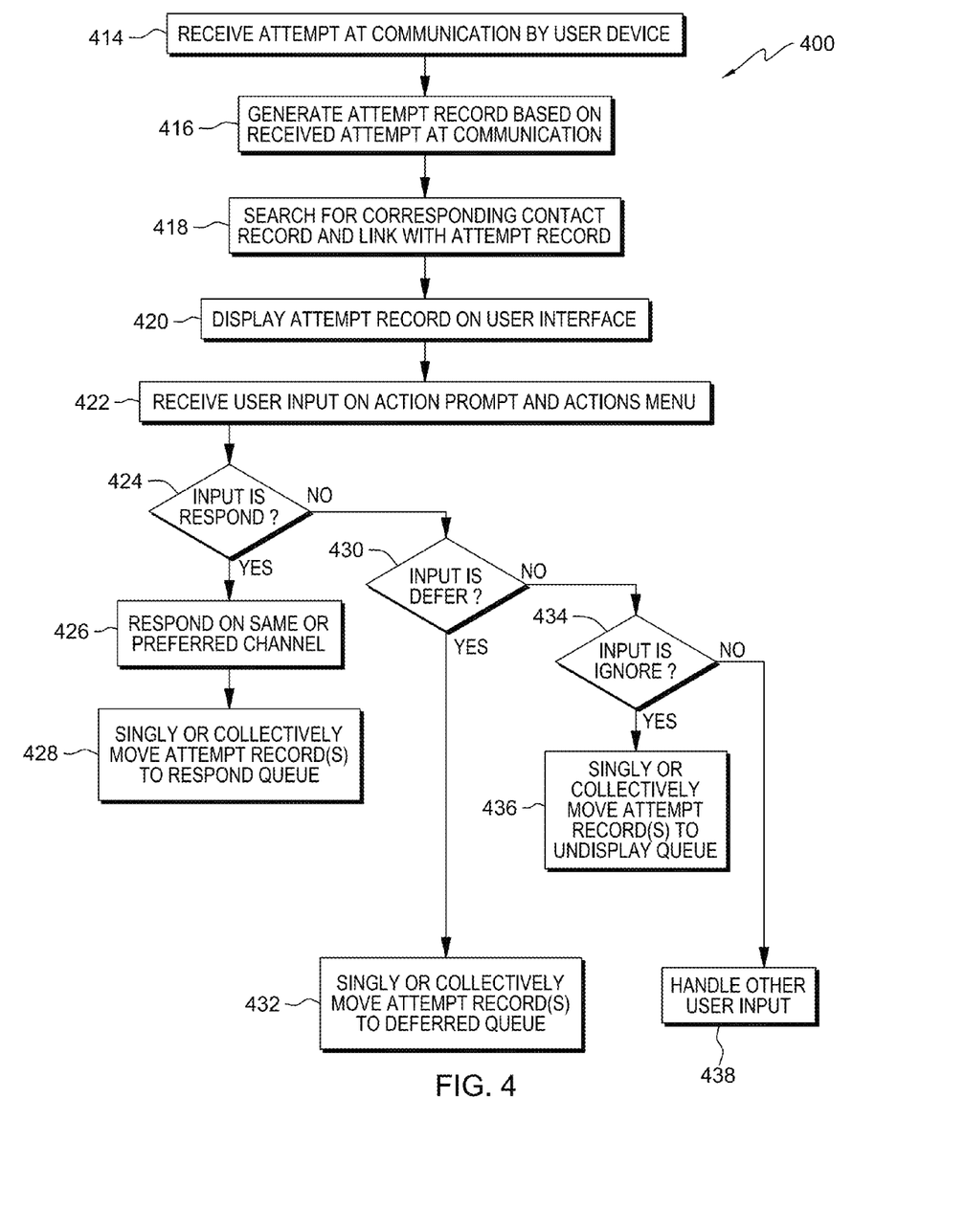
FIG. 4 is a flowchart depicting the steps followed by user device 120 in accordance with an embodiment of the present invention.

FIG. 4 is a flowchart depicting the steps followed by user device 120 in accordance with an embodiment of the present invention. In step 414, queuing program 122 of user device 120 receives an attempt at communication. For example, queuing program 122 can receive account message attempt 242, SMS message attempt 252, and call message attempt 262. In step 416, queuing program 122 generates attempt records based on the received attempts at communication. For example, queuing program 122 can generate attempt records 326a, 326b, and 326c, respectively. In step 418, queuing program 122 searches for corresponding contact records and links the corresponding contact records with the appropriate attempt records. For example, queuing program 122 links attempt records 326a and 426b with contact record 328a, and links attempt record 326c with contact record 328b.

In step 420, user interface program 124 displays attempt records on a user interface. For example, user interface program 124 displays attempt records 326a, 326b, and 326c on rows 301, 302, and 303 of user interface 125. In step 422, user interface program 124 receives user input on an action prompt and an actions menu. For example, user interface program 124 receives user input on the actions prompt of row 303, deploys actions menu 305, and receives user input on actions menu 305.

In step 424, user interface program 124 determines whether the user input includes a "Respond" user input. If so, then in step 426 user interface program 124 utilizes user device 120 to respond on a same channel or a preferred channel. Further, in step 428 queuing program 122 singly or collectively moves the appropriate attempt record(s) to the responded queue. For example, if the user input includes "Respond Preferred," then user device 120 makes an attempt at communication via the preferred channel, which can be the same channel used by the incoming attempt at communication, the most recent successfully-used channel, the most frequently used channel, any available real-time channel, any available non-real-time channel, a favorite channel pre-selected by person 102, or a selectable channel currently selected by person 102, for example. Additionally, queuing program 122 can change the queue location field of attempt record 326c to be responded queue 325c.

If in step 424 user interface program 124 determines that the user input does not include a "Respond" user input, then in step 430 user interface program 124 determines whether the user input includes a "Defer" user input. If so, then in step 432 queuing program 122 singly or collectively moves the attempt record(s) to the deferred queue. For example, if the user input includes "Defer Single," then queuing program 122 can change the queue location field of attempt record 326c to be deferred queue 325b, such that user interface program 124 alters user interface 125 to display the contents of row 303 at deferred queue 325b. If the user input includes "Defer All," then queuing program 122 can collectively change the queue location fields of attempt record 326c and related attempt records 326 to be deferred queue 325b, such that user interface program 124 alters user interface 125 to display the contents of row 303 and related rows at deferred queue 325b. Related attempt records 326 can be those that share with attempt record 326c a common person making an attempt at communication, or a common device making an attempt at communication, or a common time period within which attempts at communication are made, or a common channel type utilized in making attempts at communication, for example.

If in step 430 user interface program 124 determines that the user input does not include a "Defer" user input, then in step 434 user interface program 124 determines whether the user input includes an "Ignore" user input. If so, then in step 436 queuing program 122 singly or collectively moves the attempt record(s) to the undisplay queue. For example, if the user input includes "Ignore Single," then queuing program 122 can change the queue location field of attempt record 326c to be the undisplay queue, such that user interface program 124 alters user interface 125 to cancel the display of the contents of row 303. If the user input includes "Ignore All," then queuing program 122 can collectively change the queue location fields of attempt record 326c and related records 326 to be the undisplay queue, such that user interface program 124 alters user interface 125 to cancel the display of the contents of row 303 and related rows. Related attempt records 326 can be those that share with attempt record 326c a common person making an attempt at communication, or a common device making an attempt at communication, or a common time period within which attempts at communication are made, or a common channel type utilized in making attempts at communication, for example.

If in step 434 user interface program 124 determines that the user input does not include an "Ignore" user input, then in step 438 user interface program 124 handles other user input. For example, the user input could include a command to reorder two or more of queues 325, or to resort the rows of one of queues 325, for example.

Figure 5:
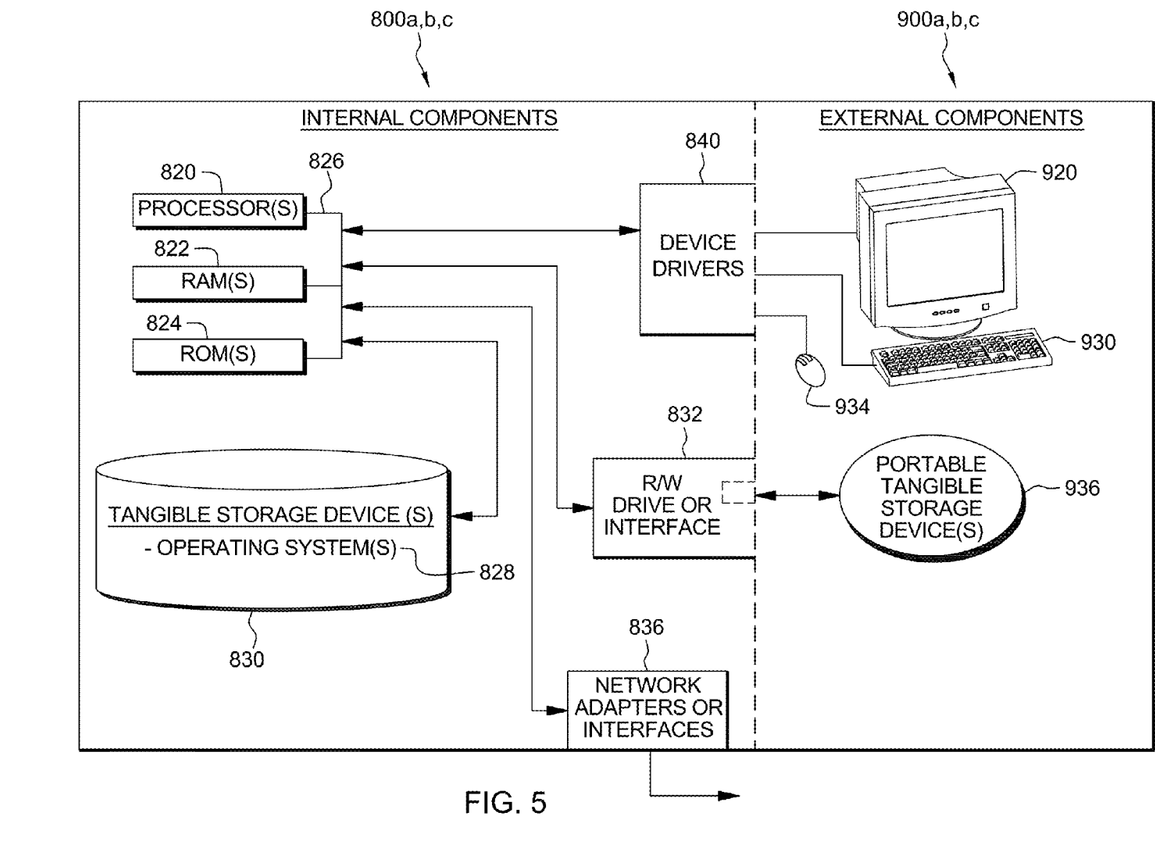
FIG. 5 is a block diagram of hardware and software within communications system 100 in accordance with an embodiment of the present invention.

FIG. 5 shows a block diagram of the components of a data processing system 800, 900, such as user device 120, proxy 130, computer 140, smart phone 150, telephone 160, or server 170, in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, a PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User device 120, proxy 130, computer 140, smart phone 150, telephone 160, or server 170 include respective sets of internal components 800 a, b, c and external components 900 a, b, c illustrated in FIG. 5. Each of the sets of internal components 800 a, b, c includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, queuing program 122, user interface program 124, and agent program 132 are stored on one or more of the respective computer-readable tangible storage devices 830 for execution by one or more of the respective processors 820 via one or more of the respective RAMs 822 (which typically include cache memory), which can also store attempts file 126 and contacts file 128. In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, c also includes a R/W drive or interface 832 to read from and write to one or more portable computer-readable tangible storage devices 936 such as a CD-ROM, DVD, memory stick, magnetic tape, magnetic disk, optical disk or semiconductor storage device. Queuing program 122, user interface program 124, and agent program 132 can be stored on one or more of the respective portable computer-readable tangible storage devices 936, read via the respective R/W drive or interface 832 and loaded into the respective hard drive 830.

Each set of internal components 800 a, b, c also includes network adapters or interfaces 836 such as a TCP/IP adapter cards, wireless wi-fi interface cards, or 3G or 4G wireless interface cards or other wired or wireless communication links. Queuing program 122, user interface program 124, and agent program 132 can be downloaded to user device 120 or proxy 130 from an external computer via a network (for example, the Internet, a local area network or other, wide area network) and respective network adapters or interfaces 836. From the network adapters or interfaces 836, queuing program 122, user interface program 124, and agent program 132 are loaded into the respective hard drive 830. The network may comprise copper wires, optical fibers, wireless transmission, routers, firewalls, switches, gateway computers and/or edge servers.

Each of the sets of external components 900 a, b, c can include a computer display monitor 920, a keyboard 930, and a computer mouse 934. External components 900 a, b, c can also include touch screens, virtual keyboards, touch pads, pointing devices, and other human interface devices to display user interface 125, for example. Each of the sets of internal components 800 a, b, c also includes device drivers 840 to interface to computer display monitor 920, keyboard 930 and computer mouse 934. The device drivers 840, R/W drive or interface 832 and network adapters or interfaces 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

Based on the foregoing, computer system, method and program product have been disclosed in accordance with the present invention. However, numerous modifications and substitutions can be made without deviating from the scope of the present invention. Therefore, the present invention has been disclosed by way of example and not limitation. The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

What is claimed is:

1. A computer-implemented method comprising the steps of:
   receiving, by a computing device, a first attempt at communication with a user made via a first communication channel;
   storing, by a computing device, a first attempt record corresponding to the first attempt at communication in an attempts file, wherein the first attempt record includes one or more of communication channel information for the first attempt and contact information for a sender using the first communication channel;
   receiving, by a computing device, a second attempt at communication with the user made through a second communication channel that is different from the first communication channel;
   storing, by a computing device, a second attempt record corresponding to the second attempt at communication in the attempts file, wherein the second attempt record includes one or more of communication channel information for the second attempt and contact information for a sender using the second communication channel;
   queuing, by a computing device, at least a portion of the first attempt record and at least a portion of the second attempt record in a first queue; and
   determining, by a computing device, that the first attempt at communication with the user and the second attempt at communication with the user were created by a common sender;
   determining, by a computing device, whether the user selects to respond to one of the first attempt and the second attempt;
   responsive to determining the user selects to respond, determining, by a computing device, a third communication channel for replying to the common sender; and
   transmitting a third attempt at communication to the common sender via the third communication channel.

2. The method of claim 1, wherein a communication channel includes at least one of a telephone channel, an email message server, a social network server, and a SMS message channel.

3. The method of claim 1, further comprising:
   determining, by a computing device, whether the user selects an action, wherein the action is one of a response command, a defer command, and an ignore command;
   responsive to determining the user inputs an action, performing, by a computing device, the action.

4. The method of claim 3, further comprising, wherein the action corresponds to a defer command, moving the first attempt record to a second queue.

5. The method of claim 3, further comprising, wherein the action corresponds to an ignore command, moving the first attempt record to a third queue.

6. The method of claim 1, further comprising determining, by a computing device, the third communication channel based, at least in part, on a user selection of a communication channel, wherein the user selection includes at least one of a most frequently used channel, an available channel, a favorite channel, or a channel used by one of the first attempt and the second attempt.

7. The method of claim 1, further comprising the step of displaying at least the first attempt record and the second attempt record to the user.

8. A computer program product comprising:
   one or more computer-readable tangible storage devices and program instructions stored on at least one of the one or more computer-readable storage devices, the program instructions comprising:
   program instructions to receive a first attempt at communication with a user made via a first communication channel;
   program instructions to store a first attempt record corresponding to the first attempt at communication in an attempts file, wherein the first attempt record includes one or more of communication channel information for the first attempt and contact information for a sender using the first communication channel;
   program instructions to receive a second attempt at communication with the user made through a second communication channel that is different from the first communication channel;
   program instructions to store a second attempt record corresponding to the second attempt at communication in the attempts file, wherein the second attempt record includes one or more of communication channel information for the second attempt and contact information for a sender using the second communication channel;
   program instructions to queue at least a portion of the first attempt record and at least a portion of the second attempt record in a first queue; and
   program instructions to determine that the first attempt at communication with the user and the second attempt at communication with the user were created by a common sender;
   program instructions to determine whether the user selects to respond to one of the first attempt and the second attempt;
   responsive to determining the user selects to respond, program instructions to determine a third communication channel for replying to the common sender; and
   program instructions to transmit a third attempt at communication to the common sender via the third communication channel.

9. The computer program product of claim 8, further comprising program instructions to display at least the first attempt record and the second attempt record to the user.

10. A system comprising:
    one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:
    program instructions to receive a first attempt at communication with a user made via a first communication channel;
    program instructions to store a first attempt record corresponding to the first attempt at communication in an attempts file, wherein the first attempt record includes one or more of communication channel information for the first attempt and contact information for a sender using the first communication channel;
    program instructions to receive a second attempt at communication with the user made through a second communication channel that is different from the first communication channel;
    program instructions to store a second attempt record corresponding to the second attempt at communication in the attempts file, wherein the second attempt record includes one or more of communication channel information for the second attempt and contact information for a sender using the second communication channel;

program instructions to queue at least a portion of the first attempt record and at least a portion of the second attempt record in a first queue; and program instructions to determine that the first attempt at communication with the user and the second attempt at communication with the user were created by a common sender;

program instructions to determine whether the user selects to respond to one of the first attempt and the second attempt;

responsive to determining the user selects to respond, program instructions to determine a third communication channel for replying to the common sender; and program instructions to transmit a third attempt at communication to the common sender via the third communication channel.

11. The system of claim 10, further comprising program instructions to display at least the first attempt record and the second attempt record to the user.

\* \* \* \* \*